United States Patent Office.

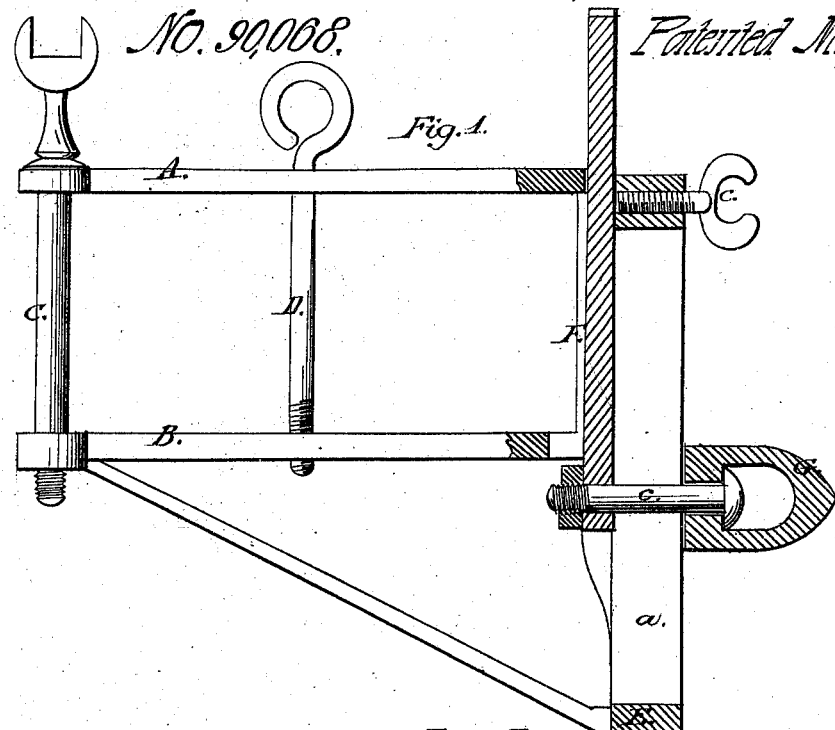
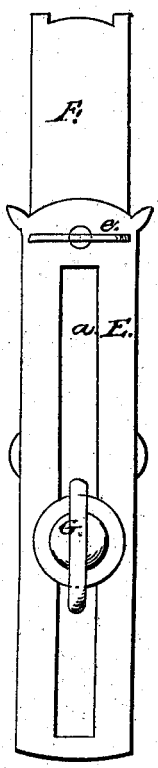

JOHN ADOLPH BILZ, OF PLEASANTON, CALIFORNIA.

Letters Patent No. 90,068, dated May 18, 1869.

IMPROVEMENT IN PLOW-CLEVIS.

The Schedule referred to in these Letters Patent and making part of the same.

*To all whom it may concern:*

Be it known that I, JOHN ADOLPH BILZ, of Pleasanton, county of Alameda, State of California, have invented an Improved Plow-Beam Clevis; and I do hereby declare the following description and accompanying drawings are sufficient to enable any person skilled in the art or science to which it most nearly appertains, to make and use my said invention or improvement without further invention or experiment.

My invention relates to a new and improved clevis for plow-beams, so constructed that the depth to which it is desired to run the plow can be regulated as desired, by simply raising and lowering a bar, and confining it by means of a set-screw.

It also consists in attaching to this sliding bar a shackle with a swivel-joint, to which the double-tree is screwed, and which turns, so as to allow the double-tree to remain in its proper position, in whatever manner the plow may be turned.

To more fully illustrate my invention, reference is had to the accompanying drawings, forming a part of this specification, of which—

Figure 1 is a side sectional elevation.

Figure 2 is a front view.

Similar letters of reference in each of the figures indicate like parts.

A and B are the two arms of a clevis, and which are attached to the end of the plow-beam, the arm A being placed on the upper, and the arm B on the lower side of the beam, and secured by a screw, C, which passes through the beam similar to that used in the ordinary clevis.

The plow is thrown to or from the land, in the usual manner, by shifting the pin D from side to side, and placing it in holes prepared for the purpose.

The front ends of the two arms are secured to a metal bar, E, having the slot $a$ running longitudinally through it. The arms are slotted back of this bar, so as to allow the bar F to slide up and down between the ends of the arms and slotted vertical bar E.

A shackle, G, is secured in front of the bar E by means of a screw, $c$, which passes through the slot $a$ and the lower end of the sliding bar F, and is secured by a nut. The shackle is secured by a swivel-joint to the screw, so that it will turn in any direction.

When the sliding bar F is raised or lowered, the screw moves in the slot $a$. The bar is held at any point desired by a set-screw, $e$.

The depth which it is desired to run the plow is regulated by moving the sliding bar up, if desired to plow deep, or down if desired to plow shallow, and keeping it in place by the set-screw $e$ at the top of the vertical bar E.

By the use of the shackle and swivel-joint, the double-tree, which is secured to the shackle, is allowed to remain in its proper position at all times; for instance, when it is desired to let the horses stand for a time, the plow is generally thrown over on its side, and when the ordinary clevis is used this motion turns the double-tree, and causes the tugs to strike the horses' legs, frequently resulting in runaways, which cause much damage, but when my clevis is used, and the plow is thus thrown down on its side, the shackle will turn, and allow the double-tree to remain in its proper position.

Having thus described my invention,

What I claim, and desire to secure by Letters Patent, is—

1. The vertical slotted bar E, secured to the ends of the two arms A and B of a clevis, substantially as and for the purpose described.

2. The sliding bar F, moving up and down through slots in said arm A and B, and held at the point desired by means of a set-screw, $g$, substantially as and for the purpose described.

3. The shackle G, attached by a swivel-joint to the screw $c$, said screw being secured to the lower end of the sliding bar F, and moving up and down in the vertical slot $a$, substantially as and for the purpose described.

In witness whereof, I have hereunto set my hand and seal.

JOHN A. BILZ. [L. S.]

Witnesses:
JOHN L. BOONE,
W. STANIFORTH.